(12) United States Patent
Hanson et al.

(10) Patent No.: US 7,543,877 B2
(45) Date of Patent: Jun. 9, 2009

(54) MATERIALS HANDLING VEHICLES HAVING SEATS WITH PIVOTING BACKRESTS

(75) Inventors: Eric J. Hanson, Peoria, IL (US); Steven R. Pulskamp, New Bremen, OH (US); Eric J. Kaiser, Ft. Recovery, OH (US); Ted R. Wagner, New Bremen, OH (US); David T. Rench, Celina, OH (US); George R. Wetterer, Troy, OH (US)

(73) Assignee: Crown Equipment Corporation, New Bremen, OH (US)

( * ) Notice: Subject to any disclaimer, the term of this patent is extended or adjusted under 35 U.S.C. 154(b) by 29 days.

(21) Appl. No.: 11/739,139

(22) Filed: Apr. 24, 2007

(65) Prior Publication Data

US 2007/0246983 A1  Oct. 25, 2007

Related U.S. Application Data

(60) Provisional application No. 60/794,342, filed on Apr. 24, 2006.

(51) Int. Cl.
*B60N 2/20* (2006.01)
(52) U.S. Cl. .................. 296/65.16; 297/354.1; 414/354
(58) Field of Classification Search .............. 296/65.01, 296/65.02, 65.05, 65.09, 65.16; 297/353–383; 414/354
See application file for complete search history.

(56) References Cited

U.S. PATENT DOCUMENTS

| | | | | |
|---|---|---|---|---|
| 2,272,980 | A | * | 2/1942 | McLellan et al. ...... 297/362.14 |
| 2,587,822 | A | | 3/1952 | Corning |
| 3,261,422 | A | * | 7/1966 | Jensen ..................... 180/89.17 |
| 3,697,128 | A | | 10/1972 | Strien et al. |
| 3,934,930 | A | | 1/1976 | Sandham |
| 4,131,260 | A | * | 12/1978 | Ambasz ....................... 248/599 |
| 4,232,900 | A | | 11/1980 | Parker |
| 4,333,683 | A | * | 6/1982 | Ambasz ....................... 297/292 |
| 4,529,247 | A | | 7/1985 | Stumpf et al. |
| 4,585,272 | A | | 4/1986 | Ballarini |
| 4,640,548 | A | | 2/1987 | Desanta |
| 4,830,430 | A | | 5/1989 | Schaefer |
| 4,852,943 | A | | 8/1989 | Roper |
| 4,871,208 | A | | 10/1989 | Hodgdon |
| 5,039,163 | A | | 8/1991 | Tolleson |
| 5,267,777 | A | | 12/1993 | Valtri |
| 5,340,194 | A | | 8/1994 | Neumuller |
| 5,423,594 | A | | 6/1995 | Hancock et al. |
| 5,447,357 | A | | 9/1995 | Dauphin |

(Continued)

FOREIGN PATENT DOCUMENTS

FR 2 359 005 A1 2/1978

(Continued)

*Primary Examiner*—Dennis H Pedder
(74) *Attorney, Agent, or Firm*—Stevens & Showalter LLP (57) ABSTRACT

A compressive member is used to bias a seat backrest into a predetermined position, generally upright as illustrated, relative to a seat base with the compressive member deforming to enable the seat to be pivoted by the application of force to the backrest. When used on a materials handling vehicle for which it is particularly applicable, the resiliently biased backrest attenuates forces that are transferred to the back of an operator occupying the seat when the vehicle is driven over irregularities in a floor supporting the vehicle.

18 Claims, 6 Drawing Sheets

U.S. PATENT DOCUMENTS

| | | | |
|---|---|---|---|
| 5,452,937 A * | 9/1995 | Piretti | 297/301.4 |
| 5,573,303 A | 11/1996 | Doerner | |
| 5,649,740 A | 7/1997 | Hodgdon | |
| 5,664,834 A | 9/1997 | Hsu | |
| 5,685,607 A | 11/1997 | Hirschmann | |
| 5,988,746 A * | 11/1999 | Raftery | 297/297 |
| 6,074,004 A | 6/2000 | Carmichael | |
| 6,116,687 A * | 9/2000 | Vogtherr | 297/300.1 |
| 6,120,096 A | 9/2000 | Miotto | |
| 6,447,063 B1 | 9/2002 | Beggs | |
| 6,471,293 B2 | 10/2002 | Ware et al. | |
| 6,491,344 B1 | 12/2002 | Stumpf et al. | |
| 6,523,895 B1 | 2/2003 | Vogtherr | |
| 6,679,551 B2 | 1/2004 | Ware et al. | |
| 6,820,934 B2 | 11/2004 | Ware et al. | |
| 6,896,327 B1 | 5/2005 | Barile, Sr. | |
| 6,905,171 B2 | 6/2005 | Knoblock et al. | |
| 7,156,459 B2 * | 1/2007 | Ambasz | 297/239 |
| 7,249,801 B2 * | 7/2007 | Tonin | 297/300.5 |
| 2003/0025370 A1 | 2/2003 | Hensel et al. | |
| 2003/0042777 A1 | 3/2003 | Ware et al. | |
| 2003/0127896 A1 | 7/2003 | Deimen et al. | |
| 2005/0052061 A1* | 3/2005 | Deimen et al. | 297/301.1 |
| 2005/0082891 A1* | 4/2005 | Lor | 297/354.1 |

FOREIGN PATENT DOCUMENTS

JP          10248671 A  *  9/1998

* cited by examiner

FIG. 10

MATERIALS HANDLING VEHICLES HAVING SEATS WITH PIVOTING BACKRESTS

CROSS REFERENCE TO RELATED APPLICATIONS

This application claims the benefit of U.S. Provisional Patent Application No. 60/794,342 filed Apr. 24, 2006 and entitled MATERIALS HANDLING VEHICLES HAVING SEATS WITH PIVOTING BACKRESTS AND THE PIVOTING BACKREST SEATS which is incorporated herein by reference in its entirety.

BACKGROUND OF THE INVENTION

The present invention relates in general to seats for materials handling vehicles and, more particularly, to materials handling vehicle seats having pivoting seat backrests which improve the comfort of vehicle operators and also improve the operators' views of elevated forks of the vehicles.

Pivoting backrests for office and dinette chairs are well known and include chairs having a variety of resilient members for enabling chair backrests to pivot relative to the chairs' seating bases in response to force applied to the backrests. The resilient members also return the chairs' backrests to neutral, resting back supporting positions when forces required for pivoting are removed. Resilient members include flat spring members made of metal, plastics, composite materials and the like, as well as pads made of elastomeric materials. The effective density of some elastomeric pads used in such chairs can be controlled by adjusting a compressive force with the amount of compressive force being used to control the amount of force required to effect movement of an associated chair member, for example the tilt of a chair as shown in U.S. Pat. Nos. 4,871,208 and 5,649,740.

Typical materials handling vehicle seats have fixed backrests that firmly support the operator during operation of the vehicles and operation of materials handling systems included on the vehicles. Unfortunately, seats having fixed seat backrests can be uncomfortable for operators when materials handling vehicles are driven over irregularities or bumps common on surfaces over which the vehicles are driven and including, for example, dock boards, joints, entries to trucks and the like. When vehicles traverse such bumps, the normally solid suspensions of the vehicles cause them to bounce and rotate so that seat backrests lurch forward, striking operators in the back if the operators' backs are close to or resting against the seat backrests. While existing seats are typically padded, repeated seat backrest impacts create discomfort and can lead to early fatigue of vehicle operators. To alleviate this discomfort, operators may assume postures leaning away from the backrests. While these postures reduce the force of seat backrest impacts, they also may lead to early operator fatigue.

Accordingly, there is a need for improved seats having pivoting backrests to attenuate the pounding action of conventional seats that occurs when a materials handling vehicle is driven over dock boards, joints and similar vehicle support surface irregularities or bumps that bounce and rotate the vehicle and the operator's seat. Such seats, and particularly their backrest pivoting mechanisms, should be of simple structure to facilitate assembly, reduce parts counts and reduce costs for the seats. Due to movement of operators within seats on materials handling vehicles during normal operation, it is possible for an operator to inadvertently place an appendage near a pivoting mechanism. Accordingly, it would be desirable to have a pivoting structure that itself protects operators from potential pinching points created by pivoting movement of the seat backrest. In the case of elastomeric pads used for seat pivoting, it is also desirable to have protective structure to prevent pad damage over time, which can otherwise be incurred by the application of force to a pivoting seat backrest that exceeds the force necessary to achieve a maximum pivot position.

SUMMARY OF THE INVENTION

In the invention of the present application, a compressive member is used to bias a seat backrest into a predetermined position, generally upright as illustrated, relative to a seat base, with the compressive member deforming to enable the seat backrest to be pivoted relative to the seat base by the application of an appropriate force to the backrest. When used on materials handling vehicles, for which it is particularly applicable, the resiliently biased backrest attenuates forces that are transferred to the backs of operators occupying the seats when the vehicles are driven over commonly occurring irregularities in surfaces on which the vehicles are driven.

In accordance with one aspect of the present invention, a materials handling vehicle comprises a body having forks supported for movement relative to the body and a seat mounted to the body for receiving an operator of the materials handling vehicle. The seat comprises a seat base, a seat backrest and seat backrest mounting structure engaging the seat base with the engagement of the backrest mounting structure and the seat base generally defining a seat backrest pivot axis. The seat backrest moves about the seat backrest pivot axis for pivoting movement relative to the seat base. A compressive member is associated with the structure and the seat backrest. The compressive member, in a neutral configuration, biases the seat backrest to a predetermined position from which the seat backrest pivots relative to the seat base upon application of force to the seat backrest sufficient to deform the compressive member from the neutral configuration.

In accordance with another aspect of the present invention, a method for attenuating forces applied to the back of an operator of a materials handling vehicle when the vehicle travels over driving surfaces having irregularities comprises providing a seat base and a seat backrest that pivots relative to the seat base. The seat backrest is resiliently biased so that the seat backrest pivots to attenuate at least a portion of the force the seat backrest would otherwise exert against an operator's back when the materials handling vehicle is driven over driving surface irregularities.

BRIEF DESCRIPTION OF THE DRAWINGS

The following description of embodiments of the present invention can be best understood when read in conjunction with the following drawings, where like structure is indicated with like reference numerals, and in which.

DETAILED DESCRIPTION OF THE INVENTION

Figure 1:
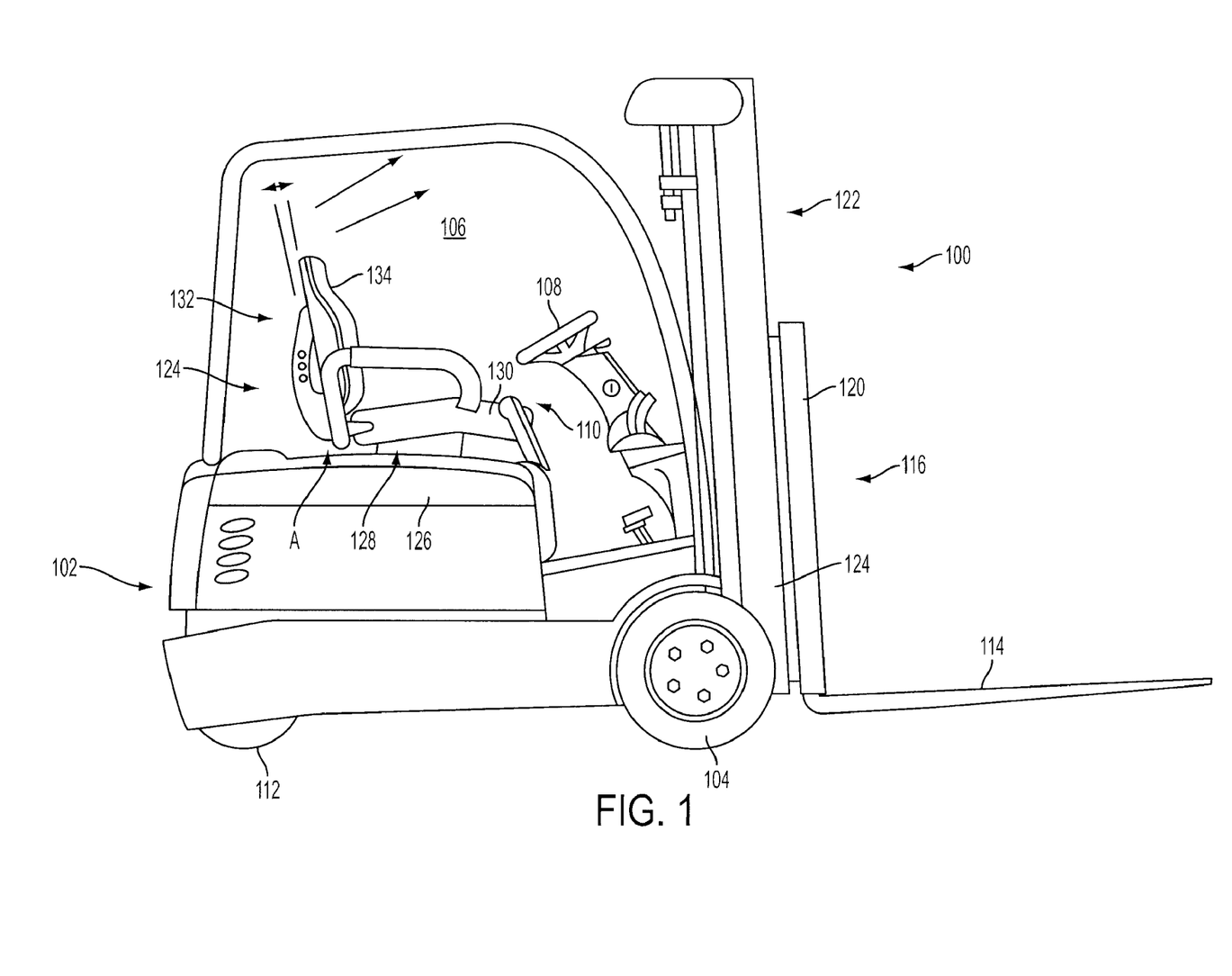
FIG. 1 is a side view of a materials handling vehicle including the present invention.

Reference is made to FIG. 1 which shows a materials handling vehicle illustrated as an electric fork lift truck 100 having a body 102 housing power equipment for driving the lift truck 100 and associated materials handling systems on the truck 100. While the present invention is not limited to use on battery powered lift trucks, as illustrated the body 102 houses a battery (not shown) for supplying power to a traction motor (not shown) connected to a pair of front drive wheels 104 (only one shown in FIG. 1) and to one or more hydraulic motors and pumps (not shown) supplying hydraulic fluid to several different systems, such as mast and fork hydraulic cylinders (not shown). The traction motor and the drive wheels 104 define a drive mechanism for moving the truck 100. An operator's compartment 106 in the body 102 is provided with a steering wheel 108 for controlling the direction of travel of the truck 100 and control handles 110 for controlling operations such as fork height, tilt, side shift and the like. The steering wheel 108 is coupled via conventional apparatus to one or a pair of steerable rear wheels 112 (only one shown in FIG. 1).

A pair of forks 114 are mounted on a fork carriage mechanism 116 that includes a fork carriage (not shown) and a load backrest 120. The forks 114 are coupled to the fork carriage which, in turn, is coupled to an extensible mast assembly 122. The load backrest 120 is also coupled to the fork carriage. The mast assembly 122 includes a fixed lower mast member 124 and at least one nested movable mast member (not shown). The lower mast member 124 is fixedly coupled to the body 102, while the most elevated movable mast member is coupled to the fork carriage. The fork carriage mechanism 116 and the mast assembly 122 together define a fork carrying assembly.

The mast assembly 122 includes one or more hydraulic cylinders (not shown) for effecting vertical movement of the nested movable mast member(s) relative to the lower mast member 124. Further, one or more hydraulic cylinders (not shown) are coupled to the body 102 and the mast assembly 122 for tilting all mast members toward and away from the truck 100 about a substantially horizontal axis. Additional hydraulic apparatus (not shown) can be provided between the mast assembly 122 and the carriage mechanism 116 for moving the carriage mechanism 116 and the forks 114 from side to side. All of the foregoing is in accordance with known fork lift truck design.

Figure 2:
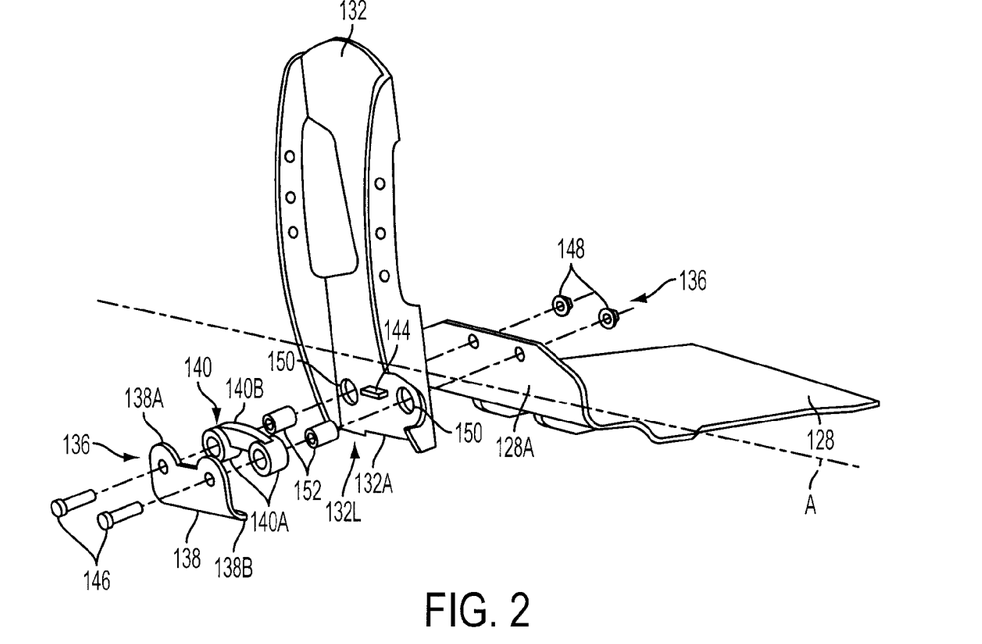
FIG. 2 is an exploded, isometric view of seat components taken from the rear of the seat and showing a seat base, a seat backrest, seat backrest mounting structure and a compressive member used in the materials handling vehicle of FIG. 1.
Figure 3:
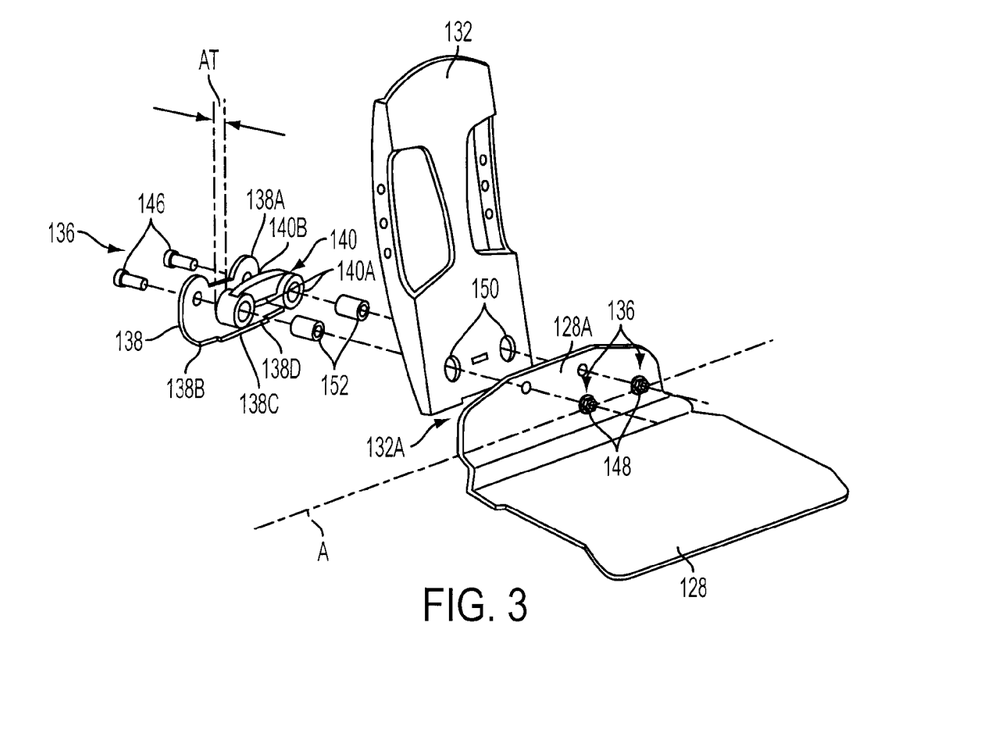
FIG. 3 is an exploded, isometric view of the seat components of FIG. 2 taken from the front of the seat base, the seat backrest, the seat backrest mounting structure and the compressive member used in the materials handling vehicle of FIG. 1.
Figure 4:
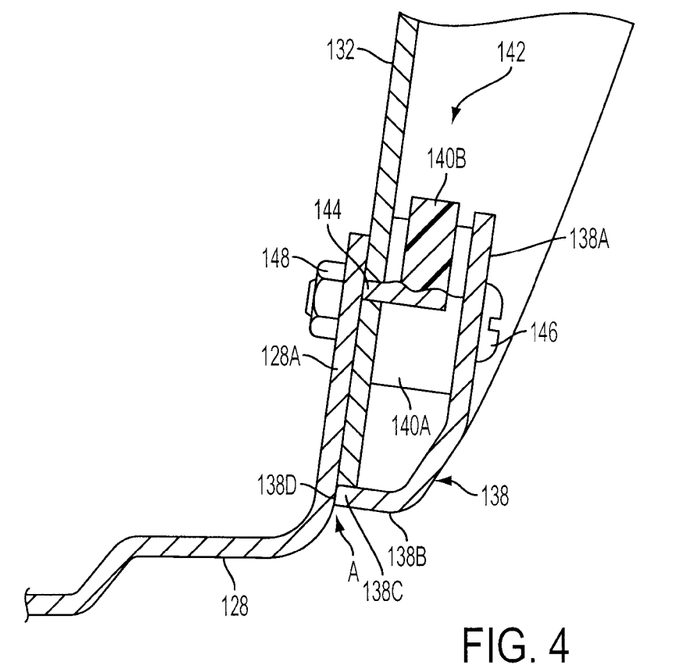
FIGS. 4 and 5 are cross-sectional side views of a portion of the seat base and seat backrest of FIGS. 2 and 3 taken generally through the center of the seat backrest showing mounting of the seat backrest to the seat base so that the seat backrest can pivot relative to the seat base with FIG. 4 showing the compressive member in a neutral configuration, biasing the seat backrest to a predetermined position, and FIG. 5 showing the compressive member deformed from its neutral configuration in a seat backrest pivoted position.
Figure 5:
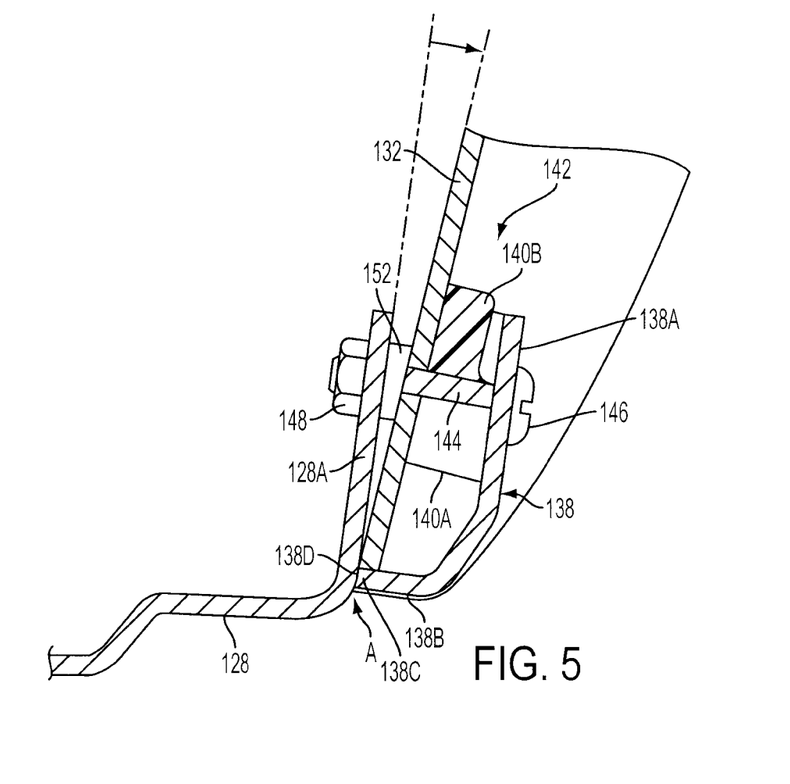
Figure 6:
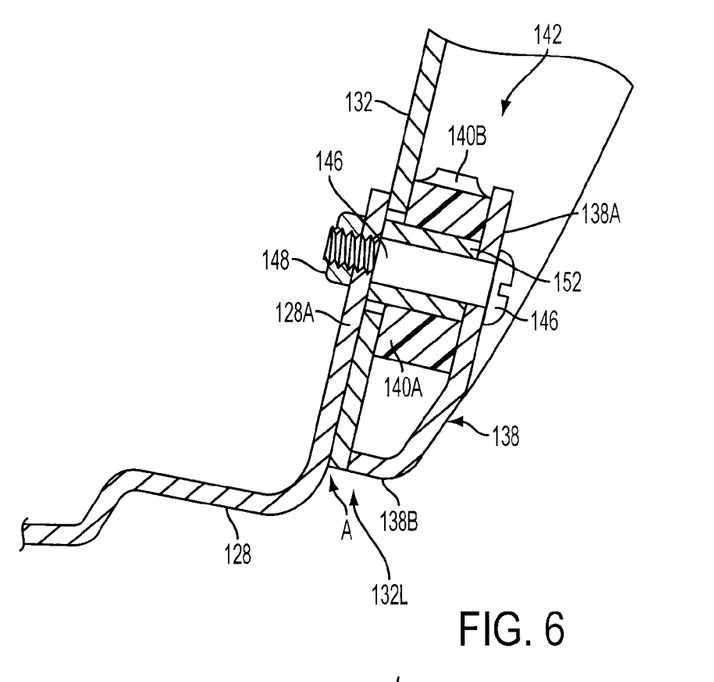
FIGS. 6 and 7 are cross-sectional side views of a portion of the seat base and seat backrest of FIGS. 2 and 3 taken generally through the center of a fastener holding a seat backrest attachment plate to the seat base and supporting the seat backrest so that it can pivot relative to the seat base with FIG. 6 showing a compressive member in a neutral configuration, biasing the seat backrest to a predetermined position, and FIG. 7 showing the compressive member deformed from its neutral configuration in a seat backrest pivoted position.
Figure 7:
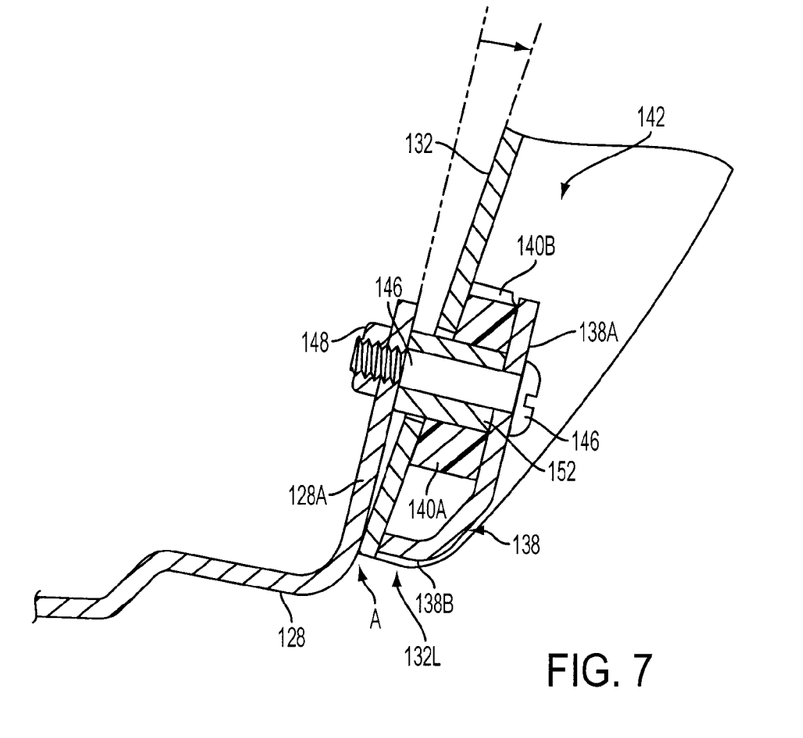

As shown in FIG. 1, a seat 124 is mounted to a seat deck 126 of the truck 100 and comprises a seat base 128 having a seat cushion 130 mounted thereto and a seat backrest 132 having a seat cushion 134 mounted thereto. Referring to FIGS. 2 and 3, the seat cushions 130 and 134 shown in FIG. 1 and other associated structures have been omitted for clarity of illustration. As illustrated, seat backrest mounting structure 136 comprises a seat backrest mounting plate 138 that engages the seat base 128 to generally define a seat backrest pivot axis A as will be described. The seat backrest 132 can pivot relative to the seat base 128 generally about the pivot axis A which is generally horizontal.

A compressive member 140 is associated with the seat backrest mounting structure 136 and the seat backrest 132. The compressive member 140, in a first configuration, which may be referred to as a neutral configuration even though some deformation of the compressive member 140 is present due to preloading the compressive member 140, biases the seat backrest 132 to a predetermined position, illustrated in FIG. 1 as being generally upright. The compressive member 140 is made of a resilient elastomeric material, such as silicone, rubber, Santoprene® thermoplastic elastomer (TPE), Santoprene® thermoplastic vulcanizate (TPV) or others that are commercially available from resin suppliers for injection molding or rubber-like compounds for compression molding, for example see Advanced Elastomer Systems at www.Santoprene.com.

It is currently believed that the compressive member 140 should have a range of firmness from about 20 Shore "A" to about 90 Shore "A" per ISO 7619 and ASTM D 2240 and that the range of firmness will likely be from about 35 Shore "A" to about 55 Shore "A" per ISO 7619 and ASTM D 2240 so that in its neutral configuration the compressive member 140 can maintain the seat backrest 132 and the seat cushion structure 134 in its generally upright position and also provide support for an operator's back when sitting normally in the seat 124. The preferred firmness of the compressive member 140 will ultimately be determined based on operator comfort and the dynamic performance of the seat backrest 132 and can vary based on given applications and preferences.

The spacing of the compressive member 140 from the pivot axis A is selected according to the firmness of the member 140 and the force required to compress the member 140 for pivoting the seat backrest 132. Further, the compressive force applied to the near side (relative to the pivot axis A) and the force applied to the far side (relative to the pivot axis A) of the compressive member 140 tend to approach equality as the distance the compressive member 140 is spaced from the pivot axis A increases. Accordingly, the compressive member 140 is spaced a sufficient distance from the pivot axis A so that excessive compression of one side of the compressive member is prevented. The current spacing of the midpoint of the compressive member 140 from the pivot axis A is about 46 mm in one working embodiment wherein the compressive member 140 has a firmness of about 55 Shore "A".

If an operator applies force over and above a resting force to the seat backrest 132 that is sufficient to deform the compressive member 140 from its first or neutral configuration, for example by leaning back against the seat backrest 132, the seat backrest 132 pivots relative to the seat base 128 generally about the axis A. This pivoting of the seat backrest 132 can provide an improved view for an operator when seated on the truck 100, e.g., the operator's view of the forks 114 of the lift truck 100 when the forks 114 are elevated may be improved as suggested by the operator view arrows shown at the upper portion of the operator's compartment 106 in FIG. 1. Due to the resilient support of the seat backrest 132, rotating or pitching motion of the truck 100, caused for example by traveling over irregularities or bumps in a vehicle supporting surface, can also result in sufficient force being applied to the seat backrest 132 so that it is pivoted relative to the seat base 128.

In the illustrated embodiment, the seat backrest mounting plate 138 extends from the seat base 128 to form a channel 142, see FIGS. 4-7, between the plate 138 and the seat base 128, the compressive member 140 being fitted within the channel 142 and extending between the plate 138 and the seat backrest 132 which is also fitted within the channel 142. A backrest stop 144 shown in FIGS. 2, 4 and 5 extends between the seat backrest 132 and the plate 138 to limit the deformation of the compressive member 140 to protect the compressive member 140 from damage due to excessive deformation which could otherwise be caused by the application of a strong force to the backrest 132.

In the illustrated embodiment, the backrest stop 144 extends from the seat backrest 132 toward the plate 138, however a backrest stop could also extend from the plate 138, be located on the compressive member 140 or otherwise be positioned between the seat backrest 132 and the plate 138 as will be apparent to those skilled in the art from the present description. In a working embodiment of the seat 124, the pivoting motion of the seat backrest 132 is limited to about 5.6 degrees, however, other pivot angles are contemplated for use with the present invention.

The seat backrest mounting structure 136 illustrated in FIGS. 2-7 further comprises at least one fastener passing through the compressive member 140 and also the seat base 128 and the plate 138. This seat backrest mounting structure 136 further comprises at least one sleeve 152 which also passes through the compressive member 140 and extends between the seat base 128 and the plate 138. For this embodiment, the length of the sleeve 152 and the compressive member 140 determine the preload on the compressive member 140 when in its neutral configuration. Alternately, the backrest mounting structure 136 could be made to be adjustable to enable an operator to select the preload on the compressive member and hence the pivoting characteristics for the seat backrest 132. For example, a screw or lever adjusting arrangement similar to those used in adjustable chairs could be incorporated into the backrest mounting structure 136.

As illustrated and currently preferred, the seat backrest 132 is not hinged or otherwise secured to the seat 124 along its pivot axis A but only rests on the structure defining the pivot axis A. However, the seat backrest 132 is movably secured to the seat base 128 and the backrest mounting plate 138 by at least one fastener and at least one sleeve. While other fasteners can be used, each fastener can be a bolt 146 and a nut 148.

In the illustrated embodiment, two bolts 146, two sleeves 152 and two nuts 148 are used to movably secure the seat backrest 132 to the seat base 128. The two bolts 146 extend through the two sleeves 152 which in turn extend through two openings 150 in the backrest 132. The two openings 150 through the backrest 132 are elongated in a generally vertical direction as shown in FIGS. 2 and 3 to enable pivoting of the backrest 132 generally about the pivot axis A relative to the seat base 128 as the compressive member 140 is deformed by pressure applied to the backrest 132.

The backrest mounting plate 138 is formed in a general L-shape (or general J-shape having its upwardly curved part truncated as shown in FIGS. 4-7) having an upper portion 138A and a lower portion 138B with the distal end 138D (see FIGS. 4 and 5) of the lower portion 138B of the plate 138 engaging the seat base 128 to generally define the pivot axis A for the seat backrest 132. The distal end 138D of the lower portion 138B of the plate 138 comprises at least one extension 138C illustrated in FIG. 3, that engages a generally upward extending back portion 128A of the seat base 128 and the lower end 132L of the seat backrest 132 comprises at least one notch 132A illustrated in FIGS. 2 and 3, to receive the extension 138C so that the bottom edge of the seat backrest 132 intermeshes with the extension or extensions on the distal end 138D of the lower portion 138B of the plate 138. Since the backrest mounting plate 138 is bolted to the seat base 128, the tab-in-slot interface defined by at least one extension 138C and at least one notch 132A maintains the pivot axis A and also prevents the seat backrest 132 from pivoting forward, i.e., toward the forks 114 of the truck 100. The tab-in-slot interface also reduces the possibility of side-to-side movement or rotation of the seat backrest 132.

Operators normally move within seats on materials handling vehicles to view areas surrounding their vehicles so that they can properly perform tasks using the vehicles and also to vary their positions and thereby improve operator comfort. During such movements, it is possible for an operator to inadvertently place an appendage near a pivoting mechanism for the seat backrest 132, for example an operator's finger or hand could be placed near the seat backrest stop 144. To prevent an operator from being pinched by the backrest stop 144 during pivoting movement of the seat backrest 132, the compressive member 140 and the seat backrest mounting plate 138 are formed to prevent access to the backrest stop 144. Additional protection can also be afforded by the seat backrest 132 itself.

The illustrated embodiment of the compressive member 140 comprises a pair of cylindrical members 140A, each having a bore extending generally through its center so that each is generally annular. The cylindrical members 140A are spaced from one another and illustrated as being interconnected by a separator 140B so that the backrest stop 144 is at least partially enclosed by the cylindrical members 140A, the separator 140B and the backrest mounting structure, more particularly, the mounting plate 138. As shown in FIGS. 2-7, the separator 140B comprises a rib narrower in width than the cylindrical members 140A that extends between the cylindrical members 140A over less than 50% of the cylindrical members 140A and across an upper portion of the cylindrical members 140A. The seat backrest 132 rests on the structure defining the pivot axis A, e.g., the notch 132A of the backrest 132 that engages the extension 138C of the plate 138, and is secured to the seat base 128 by the fasteners that extend between the plate 138 and the seat base 128. As illustrated, the fasteners each comprise one of the bolts 146 and one of the nuts 148 with the bolts 146 extending through the sleeves 152 which extend between the plate 138 and the seat base 128.

While it should be apparent from the foregoing description, for sake of clarity, a method for constructing a seat will now be briefly described. Initially, the seat base 128 is provided and a lower portion of seat backrest mounting structure, the plate 138 as illustrated, is engaged with the seat base 128 to form an engagement line which generally defines the seat backrest pivot axis A. As illustrated and currently preferred, the seat backrest 132 is not hinged or otherwise secured to the seat 124 but is rested on the seat backrest pivot axis A so that the seat backrest 132 can pivot relative to the seat base 128 generally about the pivot axis A.

The compressive member 140 is associated with the plate 138 and the seat backrest 132 with the compressive member 140 being preloaded in a first configuration such that it biases the seat backrest 132 in a predetermined position, generally upright as illustrated, wherefrom the seat backrest 132 pivots relative to the seat base 128 upon application of force to the seat backrest 132 sufficient to deform the compressive member 140 from its first configuration. In a working embodiment of the present invention, the preload was set at about 12% of the total axial thickness AT of the compressive member 140, e.g., the axial thickness AT of the cylindrical members 140A, see FIG. 3. It is currently believed that the maximum deformation of the cylindrical members 140A of the compressive member 140 should be limited to about 30% to ensure long life for the compressive member 140.

The plate 138 extending from the seat base 128 forms the channel 142 between the plate 138 and the seat base 128 so that the association of the compressive member 140 with the plate 138 and the seat backrest 132 comprises positioning the compressive member 140 within the channel 142 so that the compressive member 140 extends between the plate 138 and the seat backrest 132 which is also positioned within the channel 142.

To limit deformation of the compressive member 140 to a level which will not result in damage to the compressive member 140, a backrest stop 144 is positioned between the seat backrest 132 and the plate 138. If the backrest stop 144 is not provided and heavy force is repeatedly applied to the backrest 132, the working life of the compressive member 140 could be greatly reduced.

In accordance with another aspect of the present invention, a method for attenuating forces applied to the back of an operator of the materials handling vehicle 100 when the vehicle travels over driving surfaces having irregularities comprises providing the seat base 128 with the seat backrest 132 that pivots relative to the seat base 128. By resiliently biasing the seat backrest 132 so that it pivots to attenuate at least a portion of the force the backrest 132 would otherwise exert against an operator's back when the materials handling vehicle 100 is driven over driving surface irregularities, the operator's comfort is greatly enhanced. Resiliently biasing the seat backrest 132 may comprise use of a compressive member associated with the seat backrest 132, for example the compressive member 140 which, in a first or neutral configuration, biases the seat backrest 132 to a predetermined position wherefrom the seat backrest 132 pivots relative to the seat base 128 upon application of force to the backrest 132 sufficient to deform the compressive member 140 from its neutral configuration. It is believed that spacing the compressive member 140 away from the pivot axis A of the seat backrest 132 provides the most efficient operation and best life expectancy for the compressive member 140.

Figure 8:
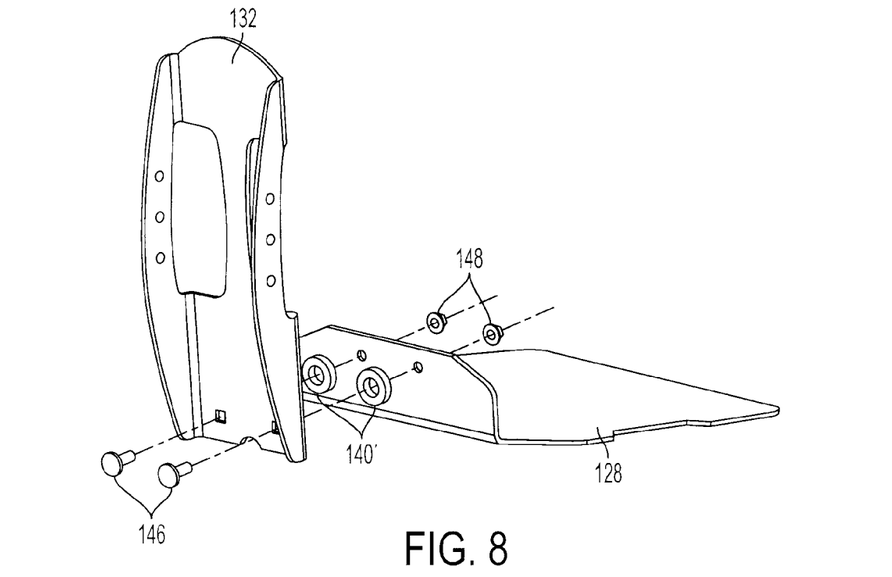
FIG. 8 is an exploded, isometric view of seat components of an alternate embodiment of the invention taken from the rear of the seat and showing a seat base, a seat backrest, seat backrest mounting structure and discrete compressive members used in the materials handling vehicle of FIG. 1.
Figure 9:
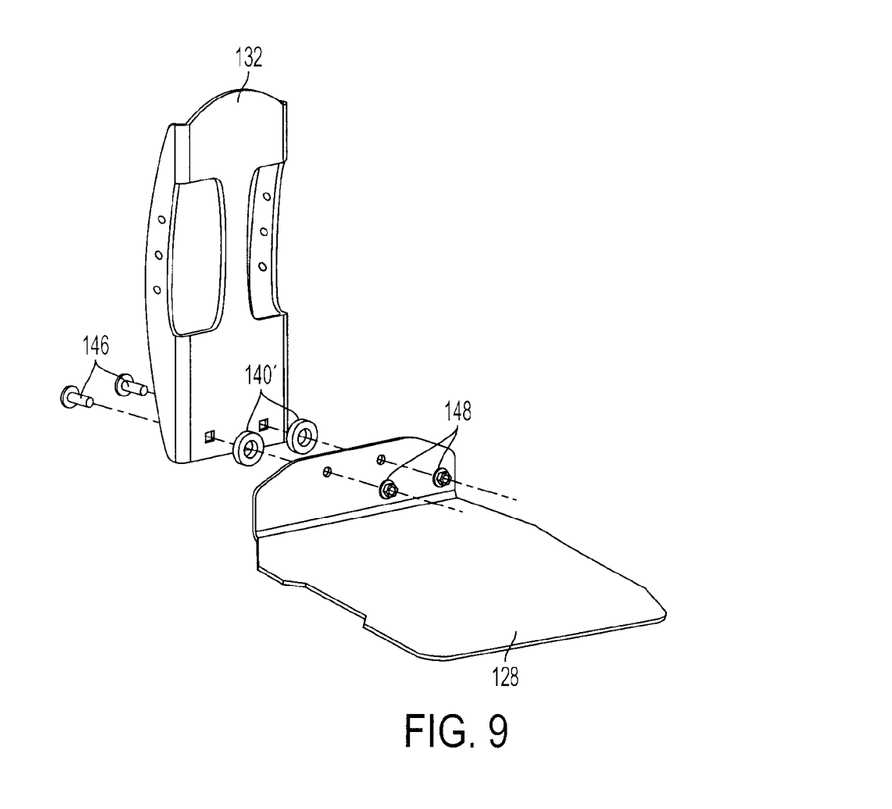
FIG. 9 is an exploded, isometric view of the seat components of FIG. 8 taken from the front of the seat base, the seat backrest, the seat backrest mounting structure and the discrete compressive members used in the materials handling vehicle of FIG. 1.
Figure 10:
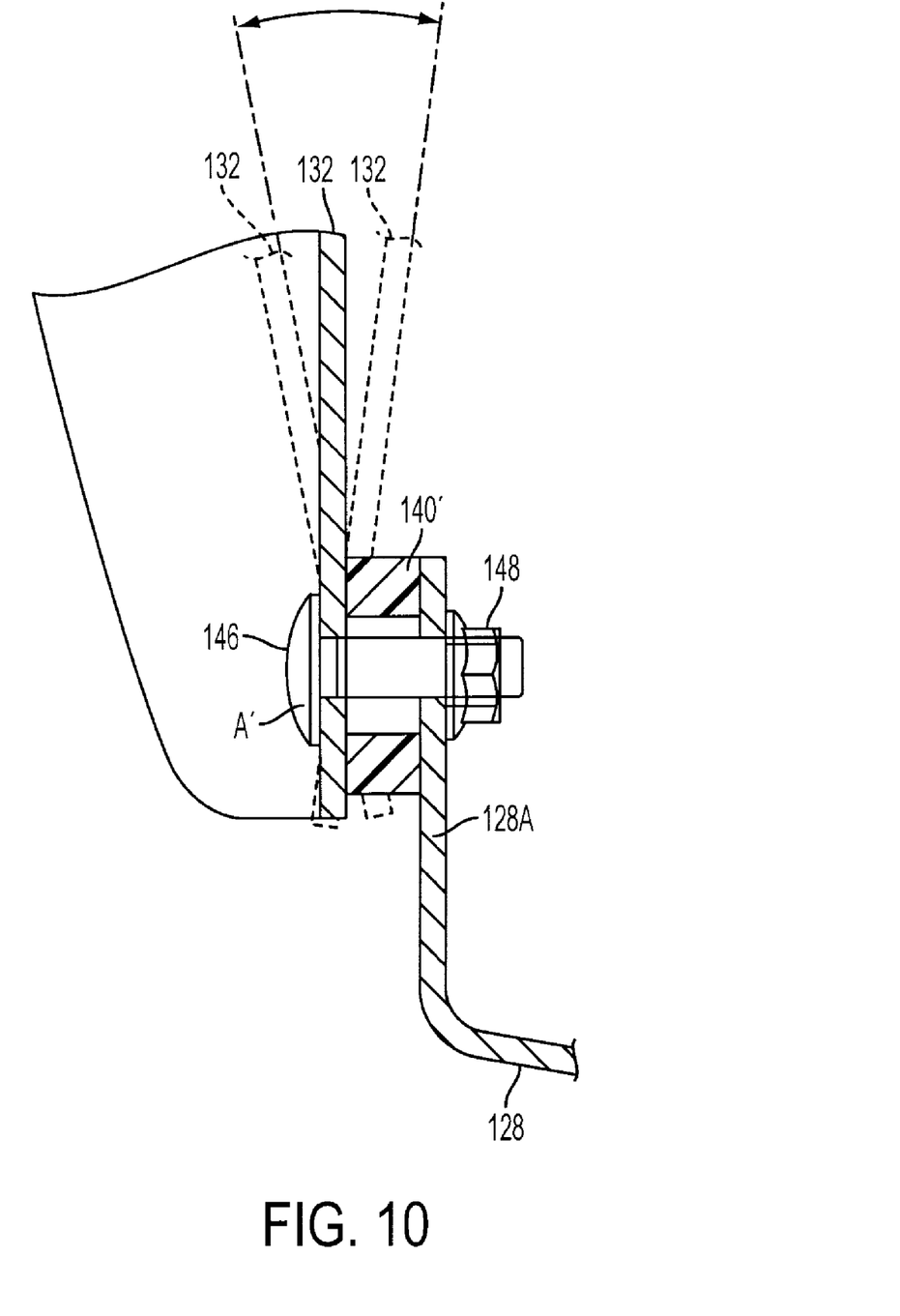
FIG. 10 is a cross-sectional side view of a portion of the seat base and seat backrest of FIGS. 8 and 9 taken generally through the center of a fastener holding the seat backrest to the seat base and supporting the seat backrest so that it can pivot relative to the seat base as indicated by broken line illustrations of the seat backrest.

In accordance with yet another aspect of the present invention as shown in FIGS. 8, 9 and 10, the seat backrest 132 is interconnected to the seat base 128 by seat backrest mounting structure comprising a pair of fasteners illustrated as bolts 146 and nuts 148. Positioned between and resiliently separating the seat backrest 132 and the generally upward extending back portion 128A of the seat base 128 are a pair of compressive members 140', shown as cylindrical or annular structures. In this embodiment, the compressive members 140' are not interconnected to one another and are preloaded dependent upon the length of the bolts 146 and/or any stop for limiting the extent the nuts 148 can be threaded onto the bolts 146. The pivot axis A' is generally defined by the base of the bolts 146 adjacent to the non-threaded bolt heads. As shown in by the broken line illustrations of the seat backrest 132 in FIG. 10, the seat backrest 132 for this embodiment can pivot both backward and forward.

The terminology used in the present application is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limiting to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. For example, the shapes of the compressive members, while illustrated as being generally cylindrical or annular, can be partially or fully angularly truncated and can be of any geometric shape. The compressive members can also be formed on a supporting plate or the like rather than having two members interconnected by a web of material. The compressive members can also be constructed as springs, such as coil springs, flat springs [Belleville washers], and the like.

Having thus described the invention of the present application in detail and by reference to illustrated embodiments thereof, it will be apparent that modifications and variations are possible without departing from the scope of the invention defined in the appended claims.

What is claimed is:

1. A materials handling vehicle comprising:
   a body;
   forks supported for movement relative to said body; and
   a seat mounted to said body for receiving an operator of said materials handling vehicle, said seat comprising:
      a seat base;
      a seat backrest;
      seat backrest mounting structure engaging said seat base, engagement of said backrest mounting structure and said seat base generally defining a seat backrest pivot axis;
      said seat backrest moving about said seat backrest pivot axis for pivoting movement relative to said seat base; and
      a compressive member associated with said structure and said seat backrest, said compressive member, in a neutral configuration, biasing said seat backrest to a predetermined position wherefrom said seat backrest pivots relative to said seat base generally about said seat backrest pivot axis upon application of force to said seat backrest sufficient to deform said compressive member from said neutral configuration, wherein said seat backrest mounting structure comprises a plate extending from said seat base to form a channel between said plate and said seat base, said compressive member being within said channel and extending between said plate and said seat backrest.

2. A materials handling vehicle as claimed in claim 1 wherein said seat backrest rests on said seat backrest pivot axis.

3. A materials handling vehicle as claimed in claim 1 further comprising a backrest stop extending between said seat backrest and said plate to limit the deformation of said compressive member to protect said compressive member from damage due to application of excessive force to said backrest.

4. A materials handling vehicle as claimed in claim 3 wherein said backrest stop extends from said seat backrest toward said plate.

5. A materials handling vehicle as claimed in claim 1 wherein said backrest mounting plate is secured to said seat base by at least one fastener and at least one sleeve that extends through said compressive member.

6. A materials handling vehicle as claimed in claim 5 wherein said seat backrest is movably secured to said seat base and said backrest mounting plate by said at least one fastener and said at least one sleeve extending through at least one opening through said backrest.

7. A materials handling vehicle as claimed in claim 6 wherein said at least one opening through said backrest is elongated in a generally vertical direction to enable pivoting of said backrest relative to said seat base.

8. A materials handling vehicle comprising:
a body;
forks supported for movement relative to said body; and
a seat mounted to said body for receiving an operator of said materials handling vehicle, said seat comprising:
a seat base;
a seat backrest;
seat backrest mounting structure engaging said seat base, engagement of said backrest mounting structure and said seat base generally defining a seat backrest pivot axis, said seat backrest mounting structure comprising a plate extending from said seat base to form a channel between said plate and said seat base;
said seat backrest moving about said seat backrest pivot axis for pivoting movement relative to said seat base; and
a compressive member within said channel and extending between said plate and said seat backrest, said compressive member, in a neutral configuration, biasing said seat backrest to a predetermined position wherefrom said seat backrest pivots relative to said seat base upon application of force to said seat backrest sufficient to deform said compressive member from said neutral configuration;
wherein said backrest mounting plate is formed in a general L-shape having an upper portion and a lower portion with the distal end of said lower portion of said plate engaging said seat base to define said pivot axis for said seat backrest.

9. A materials handling vehicle as claimed in claim 8 wherein said lower portion of said plate comprises at least one extension that engages said seat base and wherein said seat backrest is configured to intermesh with said at least one extension.

10. A materials handling vehicle comprising:
a body;
forks supported for movement relative to said body; and
a seat mounted to said body for receiving an operator of said materials handling vehicle, said seat comprising:
a seat base;
a seat backrest;
seat backrest mounting structure engaging said seat base, engagement of said backrest mounting structure and said seat base generally defining a seat backrest pivot axis, said seat backrest mounting structure comprising a plate extending from said seat base to form a channel between said plate and said seat base;
said seat backrest moving about said seat backrest pivot axis for pivoting movement relative to said seat base; and
a compressive member within said channel and extending between said plate and said seat backrest, said compressive member, in a neutral configuration, biasing said seat backrest to a predetermined position wherefrom said seat backrest pivots relative to said seat base upon application of force to said seat backrest sufficient to deform said compressive member from said neutral configuration;
a backrest stop extending between said seat backrest and said plate to limit the deformation of said compressive member to protect said compressive member from damage due to application of excessive force to said backrest;
wherein said compressive member and said seat backrest mounting structure are formed to prevent access to said backrest stop member and thereby prevent pinching of an occupant of said seat by said backrest stop upon pivoting of said seat backrest.

11. A materials handling vehicle as claimed in claim 3, wherein said compressive member comprises a pair of cylindrical members spaced from one another and interconnected by a separator, said backrest stop being at least partially enclosed by said cylindrical members, said separator and said backrest mounting structure.

12. A materials handling vehicle as claimed in claim 11 wherein said separator comprises a rib narrower in width than said cylindrical members.

13. A materials handling vehicle as claimed in claim 11 wherein said separator extends between said cylindrical members over less than 50% of said cylindrical members.

14. A materials handling vehicle as claimed in claim 11 wherein said separator extends across an upper portion of said cylindrical members.

15. A materials handling vehicle as claimed in claim 11 wherein said backrest mounting structure comprises fasteners that extend through said cylindrical members of said compressive member.

16. A materials handling vehicle as claimed in claim 15 wherein said fasteners each comprise at least one bolt, nut and sleeve.

17. A method for attenuating forces applied to a back of an operator of a materials handling vehicle when the vehicle travels over driving surfaces having irregularities, said method comprising:
providing a seat base;
providing a seat backrest that pivots relative to said seat base about a seat backrest pivot axis defined by backrest mounting structure in engagement with said seat base; and
resiliently biasing said seat backrest so that said seat backrest pivots to attenuate at least a portion of the force said seat backrest would otherwise exert against an operator's back when said materials handling vehicle is driven over driving surface irregularities, wherein said resiliently biasing said seat backrest comprises providing a compressive member associated with said seat backrest, said compressive member, in a neutral configuration, biasing said seat backrest to a predetermined position wherefrom said seat backrest pivots relative to said seat base generally about said seat backrest pivot axis upon application of force to said seat backrest sufficient to deform said compressive member from said neutral configuration, and wherein said seat backrest mounting structure comprises a plate extending from said seat base to form a channel between said plate and said seat base, said compressive member being within said channel and extending between said plate and said seat backrest.

18. A method as claimed in claim 17 further comprising spacing said compressive member away from a pivot point of said seat backrest.

\* \* \* \* \*